Figure 1:
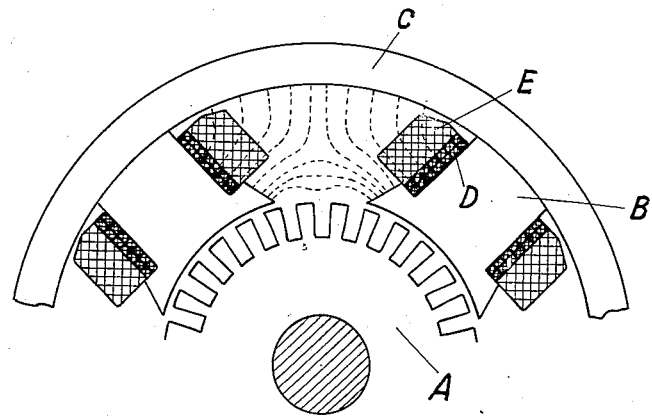

Sept. 22, 1936.                H. GROB                2,054,902
                          COMPOUND WINDING
                        Filed Feb. 12, 1935        2 Sheets-Sheet 1

Inventor:
H. Grob
By: Glascock Downing & Seebold
                              Attys.

Sept. 22, 1936.　　　　H. GROB　　　　2,054,902
COMPOUND WINDING
Filed Feb. 12, 1935　　　2 Sheets-Sheet 2
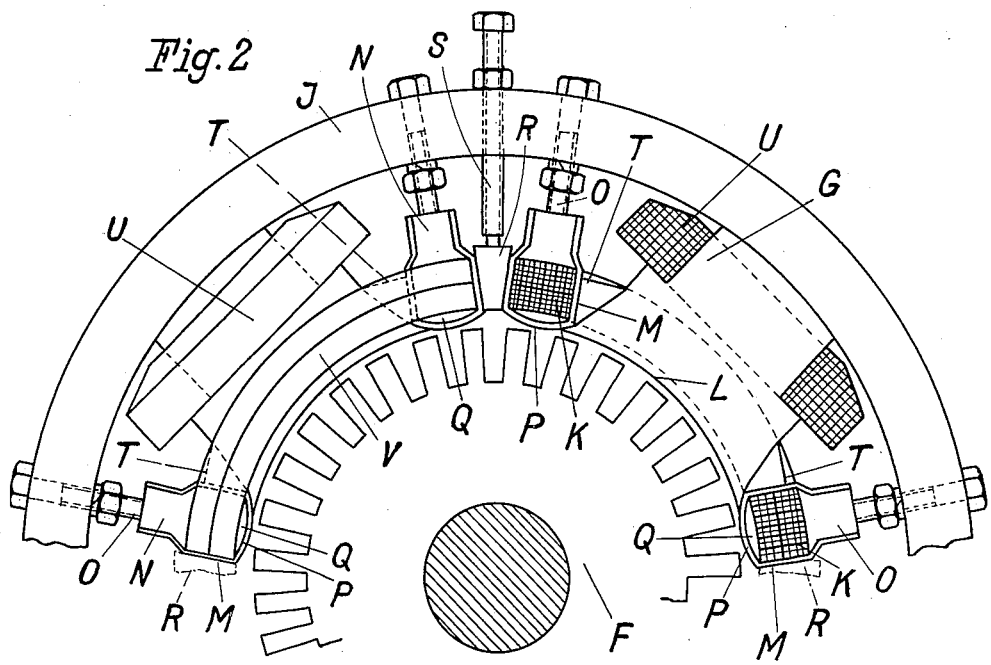
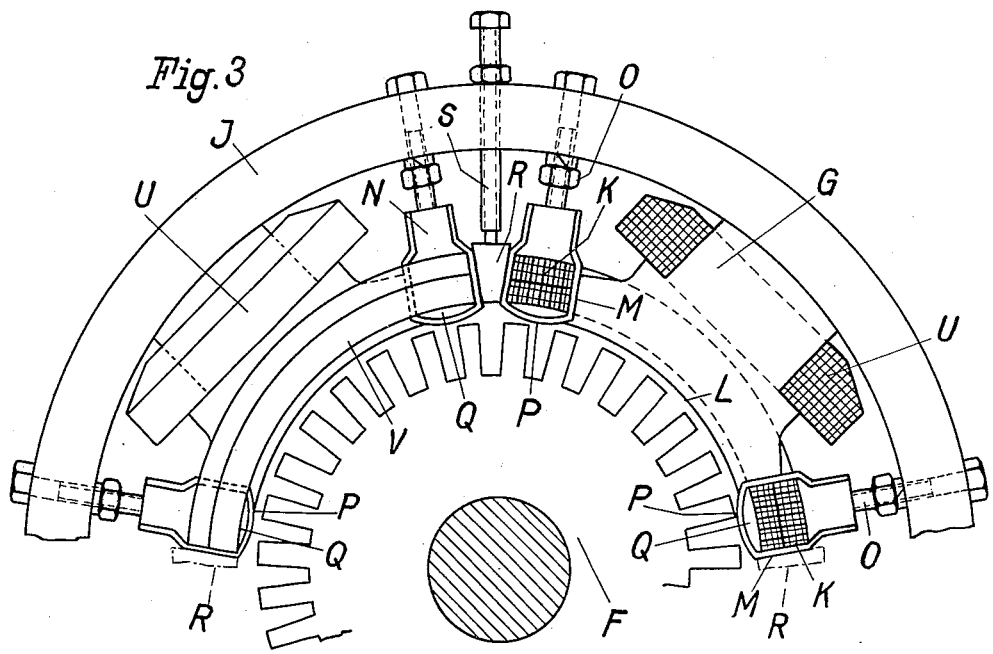
Inventor:
H. Grob
By: Glascock Downing & Seebold
Attys.

Patented Sept. 22, 1936

2,054,902

UNITED STATES PATENT OFFICE 2,054,902

COMPOUND WINDING

Hugo Grob, Berlin, Germany, assignor to N. V. Machinerieen-en Apparaten Fabrieken "Meaf", Utrecht, Netherlands Application February 12, 1935, Serial No. 6,243
In Germany March 3, 1934

9 Claims. (Cl. 171—223)

This invention relates to a compound winding for starting motors for internal combustion engines.

Compound windings of dynamos are usually arranged directly above or below the shunt wound exciter coils where the best fastening possibilities exist. As it is advisable in case of starting motors for internal combustion engines to keep the mean length of turn of the compound winding as small as possible to insure low resistance of the starting circuit and since the production of the necessary starting current should require low external voltage, the compound winding for starting motors is therefore, as a rule, placed directly upon the pole cores.

The compound winding must have a certain minimum number of turns. As the initial value of the starting current is generally quite high, an extraordinarily large number of ampere-turns becomes effective at the first moment at the pole cores and completely saturates the armature teeth. Owing to the increase of the magnetic armature resistance caused thereby, the resistance of the pole leakage flux becomes comparable to the armature resistance with the result that a considerable magnetic leakage field is produced between the poles and also between the sides of the poles and the casing.

This leakage field has the highly undesirable effect of monopolizing a part of the magnetic conductivity of the pole cores and casing, so that the passage for the useful lines of force entering the armature will be partly congested. Therefore, the considerable magnetic field that could be produced by the extraordinarily large number of ampere-turns of the compound winding in the zone of the armature slots and saturated teeth and being superposed by the field induced in the teeth will be brought about only partly, since the closing of this field by the strongly saturated pole cores and cross sections of the casing claims a large share of the available magnetomotive force. To bring into existence this additional valuable field, the size of which is absolutely independent of the size of the cross sections of teeth, in connection with the usual arrangement of the compound winding the cross sections of the poles and casing or frame would have to be extraordinarily large. This would of course considerably limit the winding space of the field coils and increase also the weight of the machine to an undesirable degree, so that the object could be attained only partly.

The invention provides a compound winding for starting motors arranged so that the pole leakage field developing during the action thereof is extraordinarily smaller than in existing arrangements.

Figure 4:
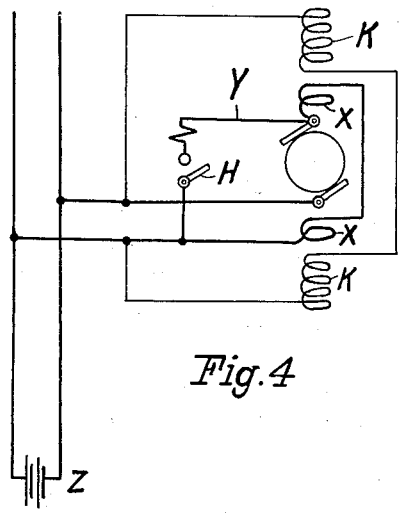

By way of example, the invention is illustrated in the accompanying drawings, in which Figure 1 shows the hitherto prevailing arrangement of the compound winding directly on the pole cores, with the leakage field indicated by broken lines; Fig. 2, an arrangement according to the invention; Fig. 3 shows a modification, and Fig. 4 is a diagrammatic view of the circuits included.

Referring to the drawings, and first to Fig. 1, A is the armature of the starting motor, B are the poles, and C is the casing. D is the compound winding directly wound upon the pole cores B, and E is the superposed shunt exciter winding. In the arrangement shown in Fig. 2, F is the armature of the starting motor, G represents the machine poles and J is the casing. The invention is based on the fundamental idea, contrary to the prevailing tendency to keep the mean length of turn of the compound winding K as small as possible, to place the latter around the pole shoes L instead of around the pole core. The harmful leakage field can develop only on those portions of the lateral surfaces of the shoes that are positioned between the wires of the compound winding and the armature, and a glance at the arrangements according to the invention as shown in Figs. 2 and 3 will make it evident that these harmful surface portions are far smaller than in the construction hitherto in use and shown in Fig. 1.

Owing to the arrangement according to the invention, practically the entire magnetic flux flowing through the pole cores and the shell serves for producing the torque and, above all, the development of a strong useful field is not impeded any more by the congesting effect of a leakage field.

Furthermore, the arrangement described affords the added advantage that, owing to the extension of the compound winding K along surface of the armature, a field produced by the compound winding will enter the armature also between the poles in consequence of the effective and extraordinarily high number of ampere turns of the winding K, so that still more armature teeth will participate in the production of the torque than are present directly underneath the surfaces of the pole shoes.

The compound winding is engaged by very strong electromagnetic forces, so that good mechanical stiffening of the coils in all directions is required, the fixing of the coil sides extending axially parallel to the armature and only at a slight distance therefrom being particularly difficult. According to the invention, this is effected by having the coil sides K embraced at some points by a metal band M secured to a supporting member N kept at an adjustable distance from the machine casing J by means of the supporting bolts O. As the part P of the metal band M facing the armature F is exposed to the varying magnetic flux coming from the surface of the armature at the teeth and the slot openings, the band, according to the invention, consists preferably of an alloy possessing a high specific resistance, such as constantan, or the like, so as to reduce the eddy currents produced in the band to a degree that is not longer harmful. The alloy must not be magnetizable. Furthermore, between the band portion P facing the armature and the coil copper K a segment-like insulating member Q is inserted to support the conductors positioned in the center of the coil sides in the direction towards the armature without excessive strain on the band or binding.

To meet the electromagnetic forces engaging the curved coil sides wedge-like members R are inserted between every two adjacent coils and supported towards the casing by the screw bolts S, so that the curved coil sides arranged around the armature form a continuous vault capable of taking care of even the greatest effects of forces directed radially inwardly.

Opposite the wedge-like members R the coil sides bear against the poles G with their inner faces, the pole area being parallel to the surfaces of the wedge-like members R. This area may be formed directly by the iron pole body itself, as indicated in Fig. 3, if the reduction of the magnetic resistance for the field of reaction of the armature, connected with this pole form, does not interfere too much with the commutation of the current. If that is the case, it is possible to let the pole iron fall back in the usual manner from the tips of the pole and to make use of a filler member T of non-magnetic material, as indicated in Fig. 2, to restore a limiting area that extends parallel to the wedge members R. It is of course essential in this connection that the iron pole has nowhere, and particularly not at the lower seating corner of the shunt coil, a relatively smaller cross section than the other points of the magnetic path. Owing to the axial shortening of the shunt coil U due to the space required by the bent side V of the compound coil, this condition is fulfilled.

The arrangement of the compound winding according to the invention permits a greater number of turns than is possible in existing types as shown in Fig. 1. The greater, however, the number of turns of a compound winding is, the lesser is the capacity of the machine acting as motor to increase its number of revolutions after the first start. A certain minimum speed, however, is necessary to insure safe starting of the internal combustion engine, and in order to provide for sufficient increase in speed despite the high number of turns the invention according to Fig. 3 employs a switch H by means of which, parallel to the compound winding K, a shunt circuit Y in addition to shunt winding U can be connected if the increase in speed is not sufficient. This shunt circuit reduces the excitation of the machine caused by the compound winding K and thus increases the motor speed. After starting, the shunt circuit Y is interrupted again. The switch may be of the hand or electromagnetic type with push-button control or automatic switching on and off of any conventional type such as is shown in patent to Jepson No. 1,240,726, September 18, 1917.

In many cases the starting motors, after starting the internal combustion engine, have to work as generators, as for instance in Diesel rail motor cars, to supply the lighting current. In the construction according to the invention the arrangement of reversing poles is not possible. As the operating speed of these generators has to be chosen quite high so as to get along with the smallest possible starting torque at the starting motor by employing the greatest possible transmission ratio, the commutating properties of the armature of the generator must comply with high requirements.

As generally known, the commutation of a direct-current machine is unfavorably influenced by the field fluctuations due to the passage of the partly open slots at the tips of the poles. These fluctuations can be prevented by placing around the machine poles short-circuited damping turns W (Fig. 3).

The invention consists partly in keeping the compound winding, required according to Fig. 4 only for starting, during subsequent operation as generator automatically short-circuited, which, after each starting, can be effected preferably by means of the same switch H which serves for connecting the compound winding to the starter battery to initiate starting. In its position of rest, this switch will then connect the compound winding not with the starter battery but to the point where the compound winding branches off from the generator line.

I claim:—

1. Starting motor for internal combustion engines, comprising a motor casing, a motor armature, magnet poles with pole shoes, a shunt winding provided on the pole core and a compound winding having a larger inner diameter than the shunt winding, the compound winding being arranged over the pole shoes at the shortest possible distance from the armature of the motor.

2. Starting motor according to claim 1, comprising special supporting members for supporting the compound winding relative to the motor casing.

3. Starting motor according to claim 1, comprising special supporting members for supporting the compound winding relative to the motor casing and metal bands secured to the said supporting members and embracing the compound winding.

4. Starting motor according to claim 1, comprising special supporting members for supporting the compound winding relative to the motor casing and metal bands secured to the said supporting members and embracing the compound winding, the said metal bands consisting of resistance material.

5. Starting motor for internal combustion engines, comprising coils placed around the pole shoes of the motor at the shortest possible distance from the armature of the motor, special supporting members for supporting the winding relative to the motor casing, metal bands secured to the said supporting members and embracing the coil conductors, the said metal bands consisting of resistance material, and a filler member of insulating material for filling the segment-like space formed between the binding and the coil.

6. Starting motor according to claim 5, comprising distance pieces arranged in the circumferential direction of the motor between each pair of adjacent coil windings and bearing against the coils, means for securing the said distance pieces relative to the motor casing.

7. Starting motor according to claim 5, comprising distance pieces arranged in the circumferential direction of the motor between each pair of adjacent coil windings and bearing against the coils, means for securing the said distance pieces relative to the motor casing and distance pieces of non-magnetic material, which are attached to the pole shoes of the motor and whereby a laying-on surface for the compound winding is formed.

8. In an electric connection for starting motors for internal combustion engines, the starting motors embracing a motor casing, a motor armature, magnet poles with pole shoes, a shunt winding on the pole core and a compound winding having a larger inner diameter than the shunt winding, said compound winding being arranged over the pole shoes at the shortest possible distance from the armature of the motor, a circuit parallel to the compound winding, and means for closing said parallel circuit upon failure of the starting motor to attain a predetermined speed.

9. In an electric connection for starting motors for internal combustion engines, the starting motors embracing a motor casing, a motor armature, magnet poles with pole shoes, a shunt winding on the pole core and a compound winding arranged over the pole shoes at the shortest possible distance from the armature of the motor, a circuit parallel to the compound winding, means for closing said parallel circuit upon failure of the starting motor to attain a predetermined speed, and means for short-circuiting the compound winding when the starting motor serves as generator after starting the internal combustion engine.

HUGO GROB.